United States Patent
Kudo

(10) Patent No.: US 11,495,255 B2
(45) Date of Patent: Nov. 8, 2022

(54) METHOD FOR MANUFACTURING MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Fumiya Kudo, Kanakura Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/387,232

(22) Filed: Jul. 28, 2021

(65) Prior Publication Data

US 2022/0093124 A1 Mar. 24, 2022

(30) Foreign Application Priority Data

Sep. 18, 2020 (JP) .............................. JP2020-157843

(51) Int. Cl.
  *G11B 5/596* (2006.01)
  *G11B 5/55* (2006.01)
(52) U.S. Cl.
  CPC ........ *G11B 5/59627* (2013.01); *G11B 5/5547* (2013.01)
(58) Field of Classification Search
  None
  See application file for complete search history.

(56) References Cited

U.S. PATENT DOCUMENTS

| 6,141,175 | A  | * | 10/2000 | Nazarian | ............ | G11B 5/59688 |
| | | | | | | 360/77.04 |
| 6,310,742 | B1 | * | 10/2001 | Nazarian | ............ | G11B 5/59688 |
| | | | | | | 360/77.04 |
| 6,487,035 | B1 | * | 11/2002 | Liu | ...................... | G11B 21/085 |
| | | | | | | 360/77.04 |
| 6,728,061 | B2 | | 4/2004 | Takaishi | | |
| 7,583,470 | B1 | | 9/2009 | Chen et al. | | |
| 9,343,094 | B1 | | 5/2016 | Ma et al. | | |
| 9,349,400 | B1 | | 5/2016 | Dhanda et al. | | |

(Continued)

FOREIGN PATENT DOCUMENTS

JP 2009-245549 A 10/2009

*Primary Examiner* — Peter Vincent Agustin
(74) *Attorney, Agent, or Firm* — Kim & Stewart LLP

(57) ABSTRACT

According to one embodiment, a method for manufacturing a magnetic disk device includes: moving a magnetic head such that a read head is located on a first learning position among a plurality of learning positions set in a radial direction of a magnetic disk; and learning RRO correction information related to the first learning position using the read head. The method further includes: moving the magnetic head such that the read head is located on a second learning position among the plurality of learning positions; and executing writing of the RRO correction information related to the first learning position using the write head in parallel while learning RRO correction information related to the second learning position using the read head when the read head is located on the second learning position.

6 Claims, 14 Drawing Sheets

(56) References Cited

U.S. PATENT DOCUMENTS

| | | | |
|---|---|---|---|
| 9,502,062 B1 | 11/2016 | Dorobantu et al. | |
| 10,366,717 B1* | 7/2019 | Kudo | G11B 19/045 |
| 2002/0027729 A1* | 3/2002 | Siew | G11B 5/59611 |
| | | | 360/25 |
| 2002/0114099 A1* | 8/2002 | Nakayama | G11B 5/59611 |
| | | | 360/77.03 |
| 2002/0126412 A1* | 9/2002 | Shibata | G11B 5/59627 |
| | | | 360/77.04 |
| 2002/0154434 A1* | 10/2002 | Satoh | G11B 5/012 |
| | | | 360/65 |
| 2003/0076617 A1* | 4/2003 | Nakagawa | G11B 5/59622 |
| | | | 360/78.14 |
| 2007/0047124 A1* | 3/2007 | Shrinkle | G11B 5/455 |
| | | | 360/55 |
| 2009/0244759 A1 | 10/2009 | Mori | |
| 2015/0055239 A1* | 2/2015 | Hara | G11B 5/59627 |
| | | | 360/48 |
| 2019/0287560 A1* | 9/2019 | Tagami | G11B 5/59627 |

* cited by examiner

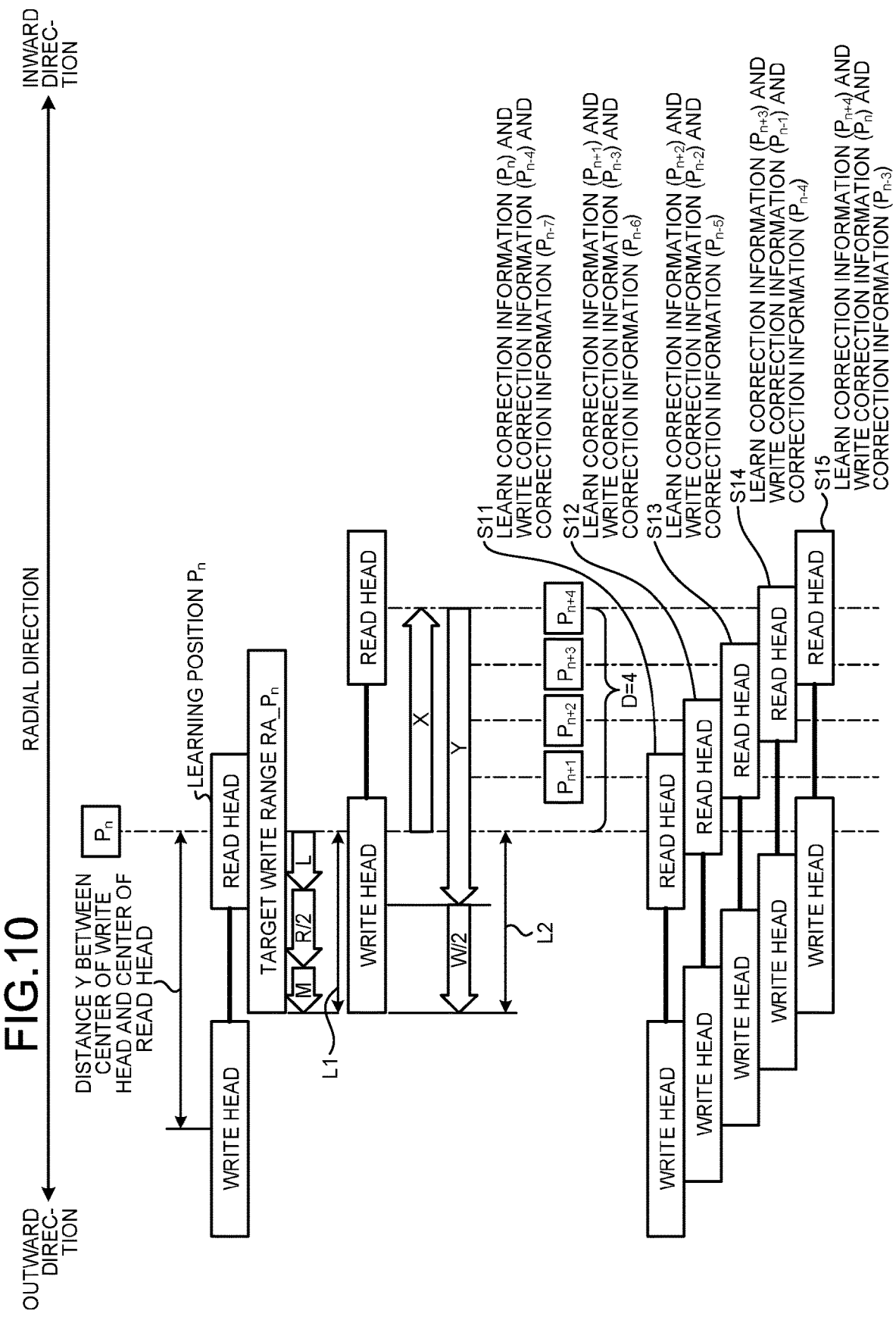

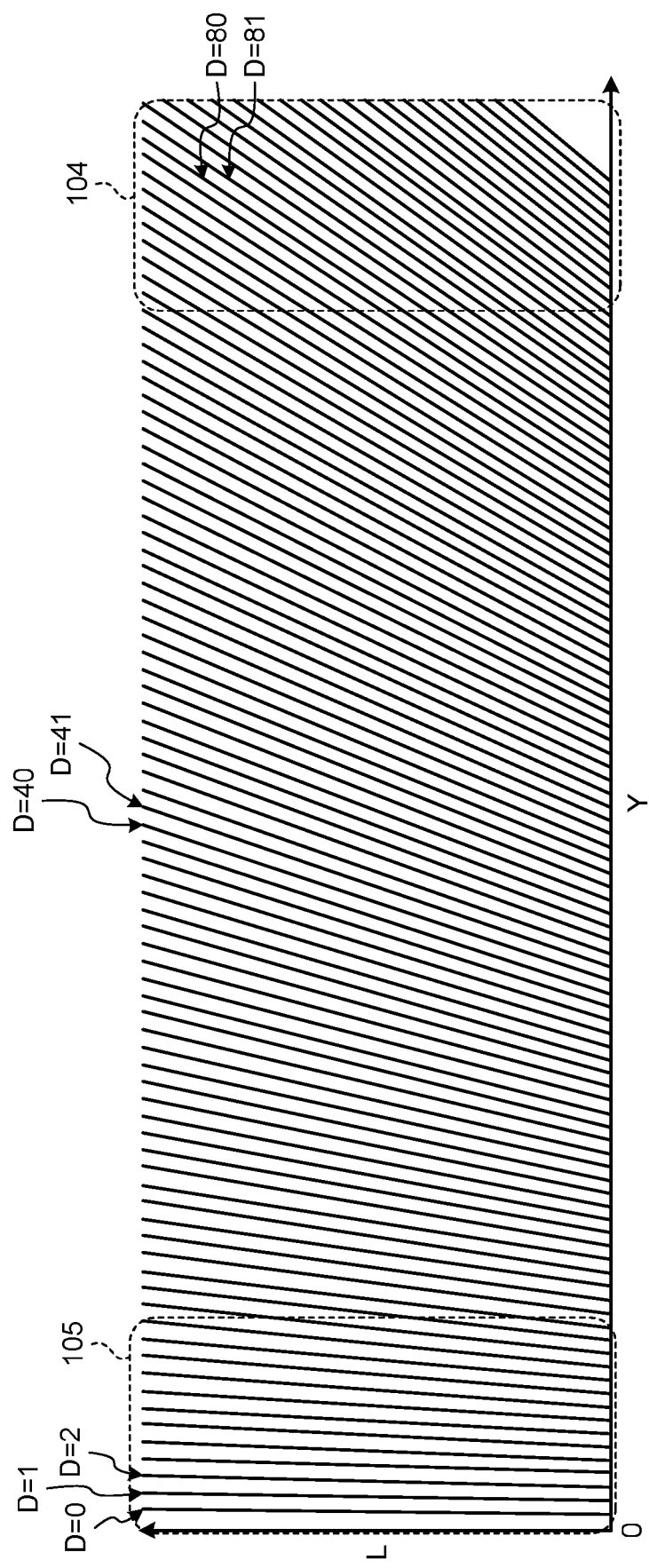

METHOD FOR MANUFACTURING MAGNETIC DISK DEVICE

CROSS-REFERENCE TO RELATED APPLICATIONS

This application is based upon and claims the benefit of priority from Japanese Patent Application No. 2020-157843, filed on Sep. 18, 2020, the entire contents of which are incorporated herein by reference.

FIELD

Embodiments described herein relate generally to a method for manufacturing a magnetic disk device.

BACKGROUND

Conventionally, repeatable run-out (RRO) is known as one component of a positioning error of a magnetic head in a magnetic disk device. RRO is a positional deviation between a track trajectory defined by a burst pattern and an actual track trajectory. RRO fluctuates in synchronization with the rotation of the magnetic disk (and a spindle motor).

In a manufacturing process of the magnetic disk device, correction information (in other words, RRO correction information) for correcting the positional deviation due to the RRO is learned, and the obtained correction information is written into the magnetic disk. When the magnetic disk device is used, a position of the magnetic head is corrected using correction information.

BRIEF DESCRIPTION OF THE DRAWINGS

FIG. 10 is a view for describing a method of setting a value of L according to the embodiment;

FIG. 11A is a graph illustrating a relationship between a value of L and a value of Y calculated based on Formula (8) of the embodiment;

DETAILED DESCRIPTION

According to the present embodiment, a method for manufacturing a magnetic disk device including a magnetic disk and a magnetic head includes: setting a plurality of learning positions in a radial direction of the magnetic disk; moving the magnetic head such that a read head of the magnetic head is located on a first learning position among the plurality of learning positions; and learning repeatable run-out (RRO) correction information related to the first learning position using the read head when the read head is located on the first learning position. The method further includes: moving the magnetic head such that the read head is located on a second learning position among the plurality of learning positions; and executing writing of the RRO correction information related to the first learning position to a first range related using the write head in parallel while learning RRO correction information related to the second learning position using the read head when the read head is located on the second learning position. Incidentally, when the read head is located on the second learning position, the write head of the magnetic head is located at a position passing through a part of the first range including the first learning position.

The method for manufacturing a magnetic disk device according to the embodiment will be described below in detail with reference to the accompanying drawings. Incidentally, the present invention is not limited to the embodiment.

Embodiment

Figure 1:
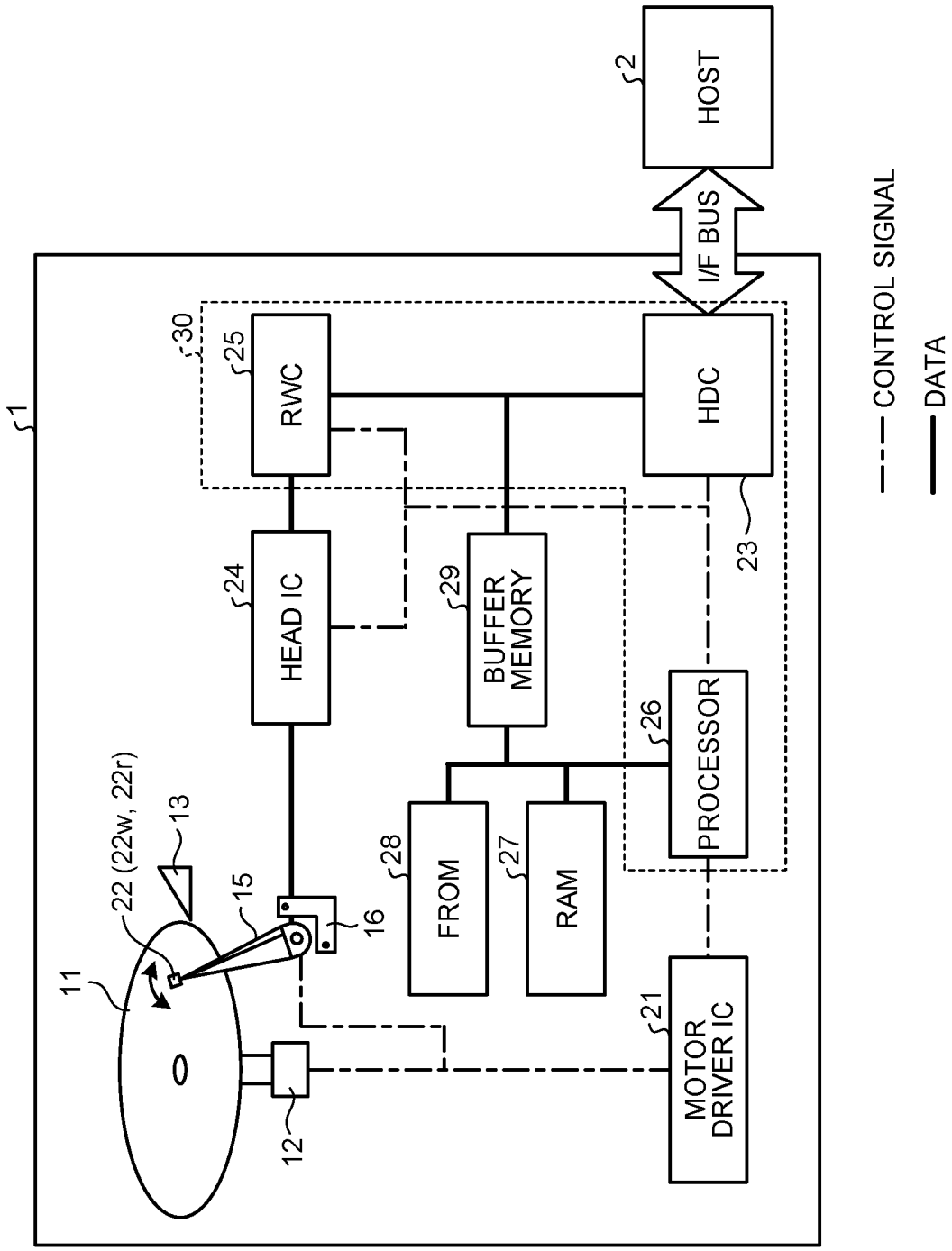
FIG. 1 is a schematic diagram illustrating an example of a configuration of a magnetic disk device of an embodiment.

FIG. 1 is a schematic diagram illustrating an example of a configuration of a magnetic disk device 1 of an embodiment.

The magnetic disk device 1 is connected to a host 2. The magnetic disk device 1 can receive an access command such as a write command and a read command from the host 2.

The magnetic disk device 1 includes a magnetic disk 11 having a magnetic layer formed on its surface. The magnetic disk device 1 writes data to the magnetic disk 11 or reads data from the magnetic disk 11 in response to the access command.

The write and read of data are performed via a magnetic head 22. Specifically, the magnetic disk device 1 includes a spindle motor 12, a lamp 13, an actuator arm 15, a voice coil motor (VCM) 16, a motor driver integrated circuit (IC) 21, a magnetic head 22, a hard disk controller (HDC) 23, a head IC 24, a read/write channel (RWC) 25, a processor 26, a RAM 27, a flash read only memory (FROM) 28, and a buffer memory 29, in addition to the magnetic disk 11.

The magnetic disk 11 is rotated at a predetermined rotational speed by the coaxially mounted spindle motor 12. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 by a write head $22w$ and a read head $22r$ provided therein. In addition, the magnetic head 22 is attached to a distal end of the actuator arm 15. The magnetic head 22 is moved in the radial direction of the magnetic disk 11 by the VCM 16 driven by the motor driver IC 21.

When the rotation of the magnetic disk 11 is stopped or the like, the magnetic head 22 is moved onto the lamp 13. The lamp 13 is configured to hold the magnetic head 22 at a position separated from the magnetic disk 11.

During the read, the head IC 24 amplifies and outputs a signal read from the magnetic disk 11 by the magnetic head 22 and supplies the signal to the RWC 25. In addition, the head IC 24 amplifies a signal corresponding to write target data supplied from the RWC 25 and supplies the amplified signal to the magnetic head 22 during the write.

The HDC 23 performs control of data transmission and reception performed with the host 2 via an I/F bus, control of the buffer memory 29, error correction processing of read data, and the like.

The buffer memory 29 is used as a buffer of data to be transmitted to and received from the host 2. For example, the buffer memory 29 is used to temporarily store the data written to the magnetic disk 11 or the data read from the magnetic disk 11.

The buffer memory 29 is configured using, for example, a volatile memory that can operate at high speed. A type of the memory constituting the buffer memory 29 is not limited to a specific type. For example, the buffer memory 29 may be configured using a dynamic random access memory (DRAM), a static random access memory (SRAM), or a combination thereof.

The RWC 25 modulates write target data to be supplied from the HDC 23 and supplies the modulated data to the head IC 24. In addition, the RWC 25 demodulates a signal read from the magnetic disk 11 and supplied from the head IC 24 and outputs the demodulated signal as digital data to the HDC 23.

The processor 26 is, for example, a central processing unit (CPU). The RAM 27, the flash read only memory (FROM) 28, and the buffer memory 29 are connected to the processor 26.

The FROM 28 is a nonvolatile memory. Firmware (program data) and various operation parameters are stored in the FROM 28. Incidentally, the firmware may be stored on the magnetic disk 11.

The RAM 27 is configured using, for example, a DRAM, an SRAM, or a combination thereof. The RAM 27 is used as an operation memory by the processor 26. The RAM 27 is used as an area in which firmware is loaded and an area in which various types of management data are held.

The processor 26 performs overall control of the magnetic disk device 1 according to the firmware stored in the FROM 28 or the magnetic disk 11. For example, the processor 26 loads the firmware from the FROM 28 or the magnetic disk 11 into the RAM 27, and executes control of the motor driver IC 21, the head IC 24, the RWC 25, the HDC 23, and the like according to the firmware in the RAM 27.

Incidentally, the configuration including the RWC 25, the processor 26, and the HDC 23 may also be regarded as a controller 30. The controller 30 may further include another element (for example, the RAM 27, the FROM 28, the buffer memory 29, the RWC 25, or the like).

In addition, the firmware program may be stored in the magnetic disk 11. In addition, some or all of functions of the controller 30 may be implemented by a hardware circuit such as a field-programmable gate array (FPGA) and an application specific integrated circuit (ASIC).

Figure 2:
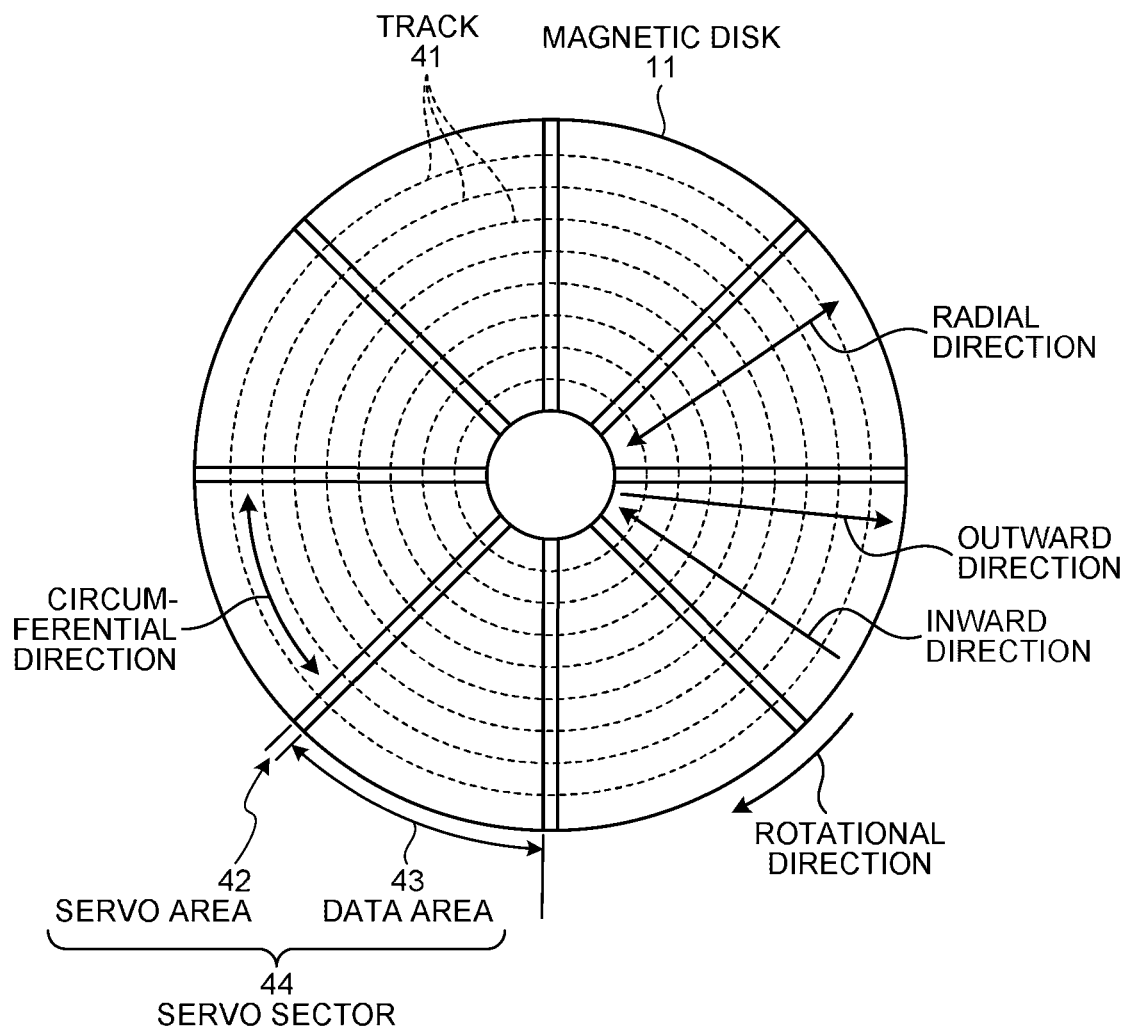
FIG. 2 is a schematic view illustrating an example of a configuration of a magnetic disk of the embodiment.

FIG. 2 is a schematic view illustrating an example of a configuration of the magnetic disk 11 of the embodiment. Incidentally, a direction from the outer peripheral side to the inner peripheral side of the magnetic disk 11 in the radial direction is referred to as an inward direction in the magnetic disk 11. A direction from the inner peripheral side to the outer peripheral side of the magnetic disk 11 is referred to as an outward direction. In addition, FIG. 2 illustrates an example of a rotational direction of the magnetic disk 11.

Servo information is written to the magnetic disk 11 in a manufacturing process, for example, by a servo writer or self-servo write (SSW). FIG. 2 illustrates servo areas 42 arranged radially as an example of the arrangement of servo areas in which the servo information is written.

The servo information includes sector/cylinder information, a burst pattern, a post code, and the like. The sector/cylinder information can give a servo address (servo sector address) in the circumferential direction of the magnetic disk 11 and a position (track number) of a track set in the radial direction. The track number obtained from the sector/cylinder information is an integer value, and the burst pattern represents an offset amount after the decimal point with the track number as a reference.

There is a case where a position in the radial direction (radial position) of a track, set based on the burst pattern (more precisely, a combination of the sector/cylinder information and the burst pattern) deviates from an ideal radial position of a track due to a writing error of the burst pattern or the like. This positional deviation occurs repeatedly in the same manner with one rotation of the magnetic disk (and the spindle motor) as a cycle, and thus, is called RRO. In the manufacturing process, correction information for correcting the positional deviation due to RRO is learned at a plurality of radial positions, and the correction information is written to the magnetic disk 11 as the post code. Further, when the magnetic disk device 1 is used, control to cancel the positional deviation caused by RRO based on the correction information is executed at the time of positioning the magnetic head 22 on the target track.

Incidentally, a data area 43 in which data can be written is provided between the servo areas 42 in the example illustrated in FIG. 2. One servo area 42 and one data area 43 following the relevant servo area 42 constitute a servo sector 44. Further, a plurality of concentric tracks 41 are set in the radial direction of the magnetic disk 11. In the data area 43, a plurality of data sectors are continuously formed along the respective tracks 41. The magnetic head 22 writes and reads data to and from each data sector.

The read head 22r and the write head 22w are provided in the magnetic head 22 to be separated from each other. Thus, the read head 22r and the write head 22w are not necessarily located at the same radial position in a state where the magnetic head 22 is positioned on the magnetic disk 11.

Figure 3:
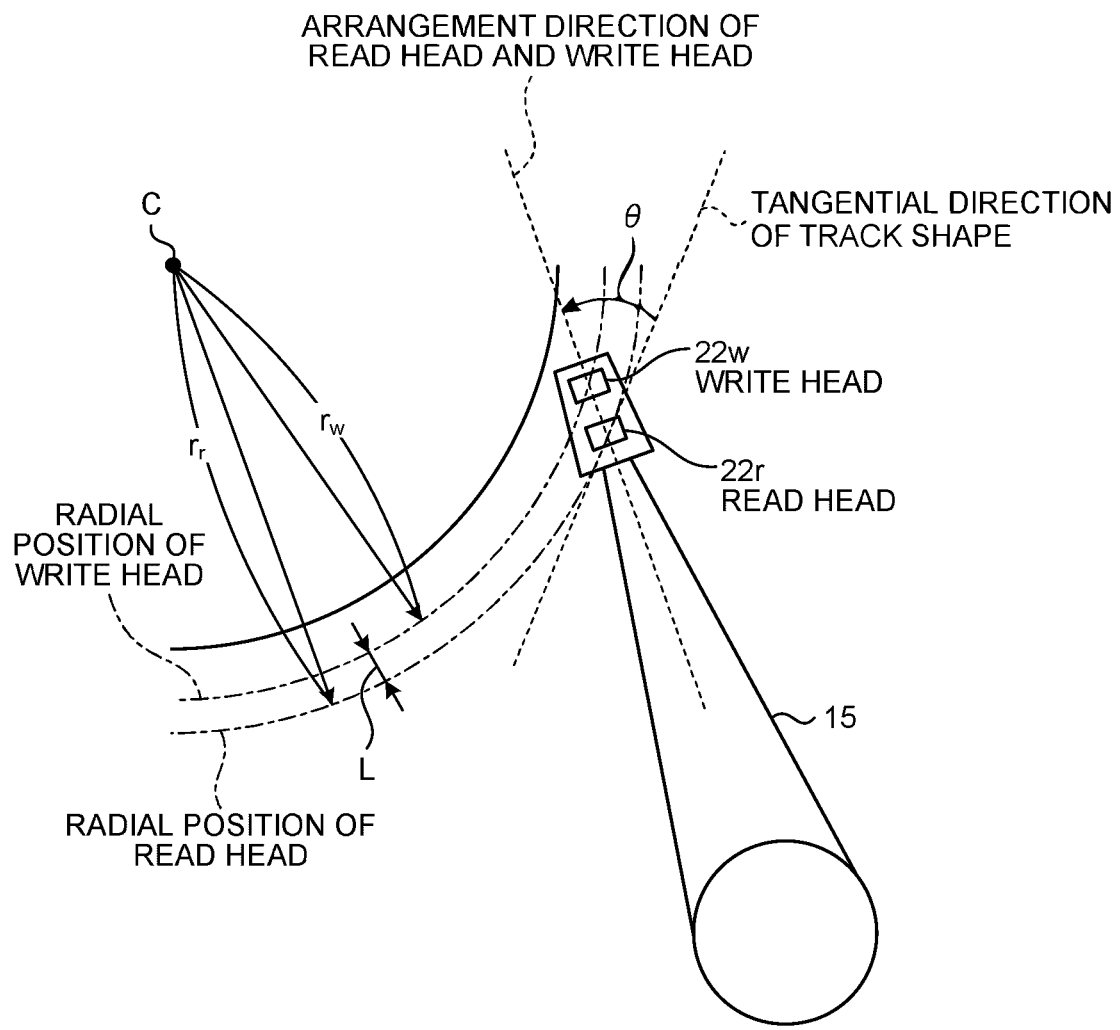
FIG. 3 is a view for describing an example of a positional relationship between a read head and a write head of the embodiment.

FIG. 3 is a view for describing an example of a positional relationship between the read head 22r and the write head 22w of the embodiment. According to the example illustrated in this drawing, the read head 22r and the write head 22w are arranged in an extending direction of the actuator arm 15. Further, the read head 22r is arranged on a side closer to a rotation axis of the actuator arm 15 than the write head 22w.

In the example illustrated in FIG. 3, in a case where the read head 22r is positioned on a certain track, an angle θ, formed by an arrangement direction of the read head 22r and the write head 22w and a tangential direction of the track as a positioning target is non-zero. As a result, a radial position of the read head 22r and a radial position of the write head 22w are different. When a distance from a rotation center C of the magnetic disk 11 to the radial position of the read head 22r is expressed as $r_r$ and a distance from the rotation center C of the magnetic disk 11 to the radial position of the write head 22w is expressed as $r_w$, the radial position of the read head 22r and the radial position of the write head 22w are separated by Y (=|$r_r$−$r_w$|) in the radial direction of the magnetic disk 11. Hereinafter, Y is referred to as a distance between head positions.

The distance between head positions may vary depending on a position of the magnetic head 22.

Figure 4:
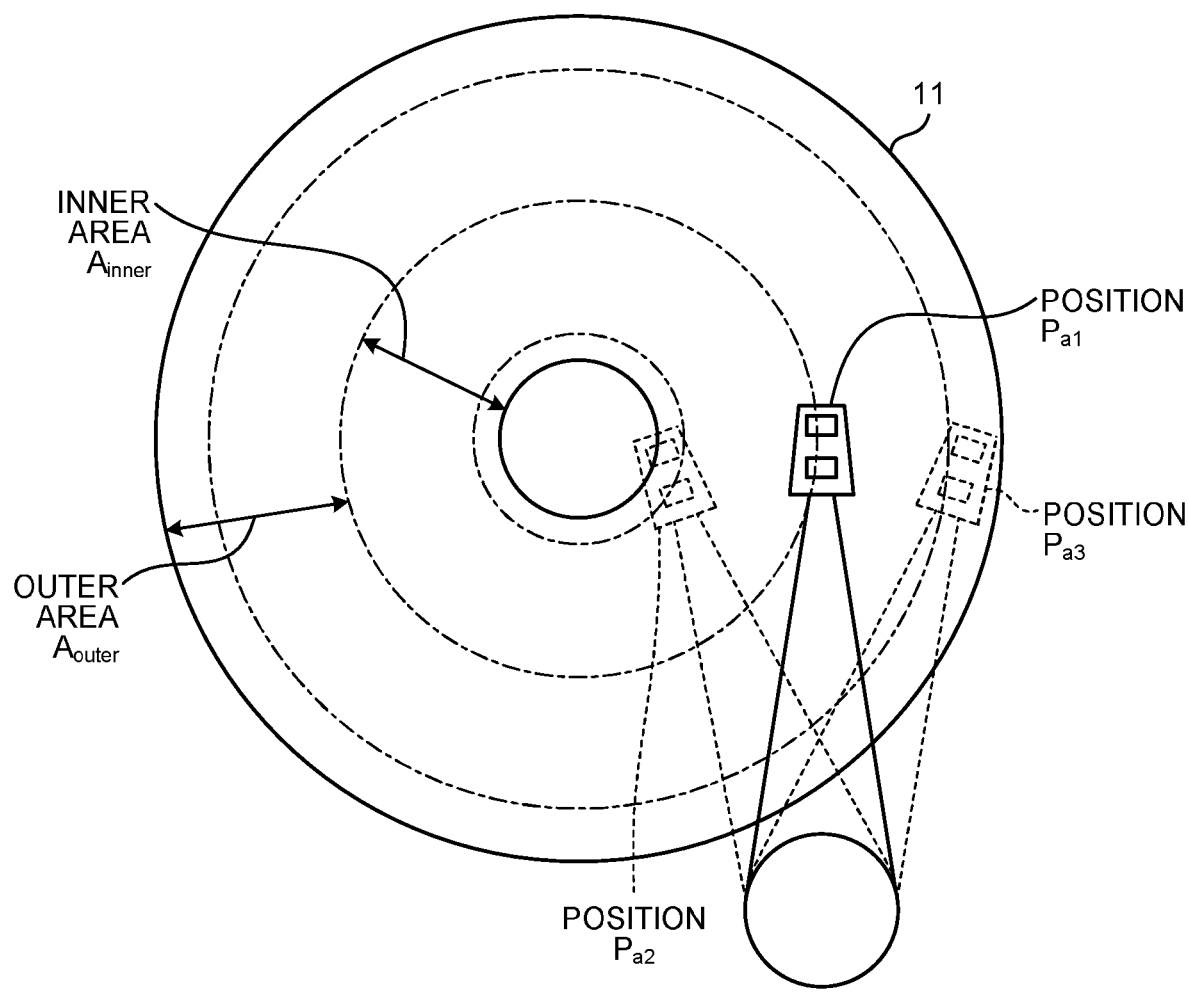
FIG. 4 is a view for describing that a distance between head positions varies depending on a position of a magnetic head in the embodiment.

FIG. 4 is a view for describing that the distance between head positions varies depending on the position of the magnetic head 22 in the embodiment.

For example, at a position $P_{a1}$, a direction in which the write head 22w and the read head 22r are arranged is orthogonal to the radial direction. In such a case, the radial position of the read head 22r and the radial position of the write head 22w become equal so that the distance between head positions Y is zero.

In a case where the magnetic head 22 is located in an area on the inner peripheral side of the position $P_{a1}$ (referred to as an inner area $A_{inner}$), for example, in a case where the magnetic head 22 is located at a position $P_{a2}$, the write head 22w is located on the inner peripheral side of the read head 22r as in the example illustrated in FIG. 3. That is, Y is non-zero. Further, a value of Y increases as the position of the magnetic head 22 moves away from the position $P_{a1}$ to the inner peripheral side.

In a case where the magnetic head 22 is located in an area on the outer peripheral side of the position $P_{a1}$ (referred to as an outer area $A_{outer}$), for example, in a case where the magnetic head 22 is located at a position $P_{a3}$, the write head 22w is located closer to the outer peripheral side of the magnetic disk 11 than the read head 22r. That is, Y is non-zero. Further, the value of Y increases as the position of the magnetic head 22 moves away from the position $P_{a1}$ to the outer peripheral side.

Incidentally, the examples illustrated in FIGS. 3 and 4 are merely examples. For example, the arrangement direction of the write head 22w and the read head 22r does not necessarily coincide with the extending direction of the actuator arm 15.

As described above, the correction information for correcting the positional deviation due to the RRO is learned, and the correction information obtained by the learning is written to the magnetic disk 11 as the post code, in the manufacturing process. Further, when the magnetic disk device 1 is used, the positional deviation due to the RRO is canceled based on the correction information written in the magnetic disk 11. Incidentally, learning the correction information refers to measuring a difference between a position indicated by the sector/cylinder information and the burst pattern and an ideal position, and acquiring the difference obtained by the measurement as the correction information. That is, learning can be rephrased as measurement, calculation, or acquisition.

Figure 5:
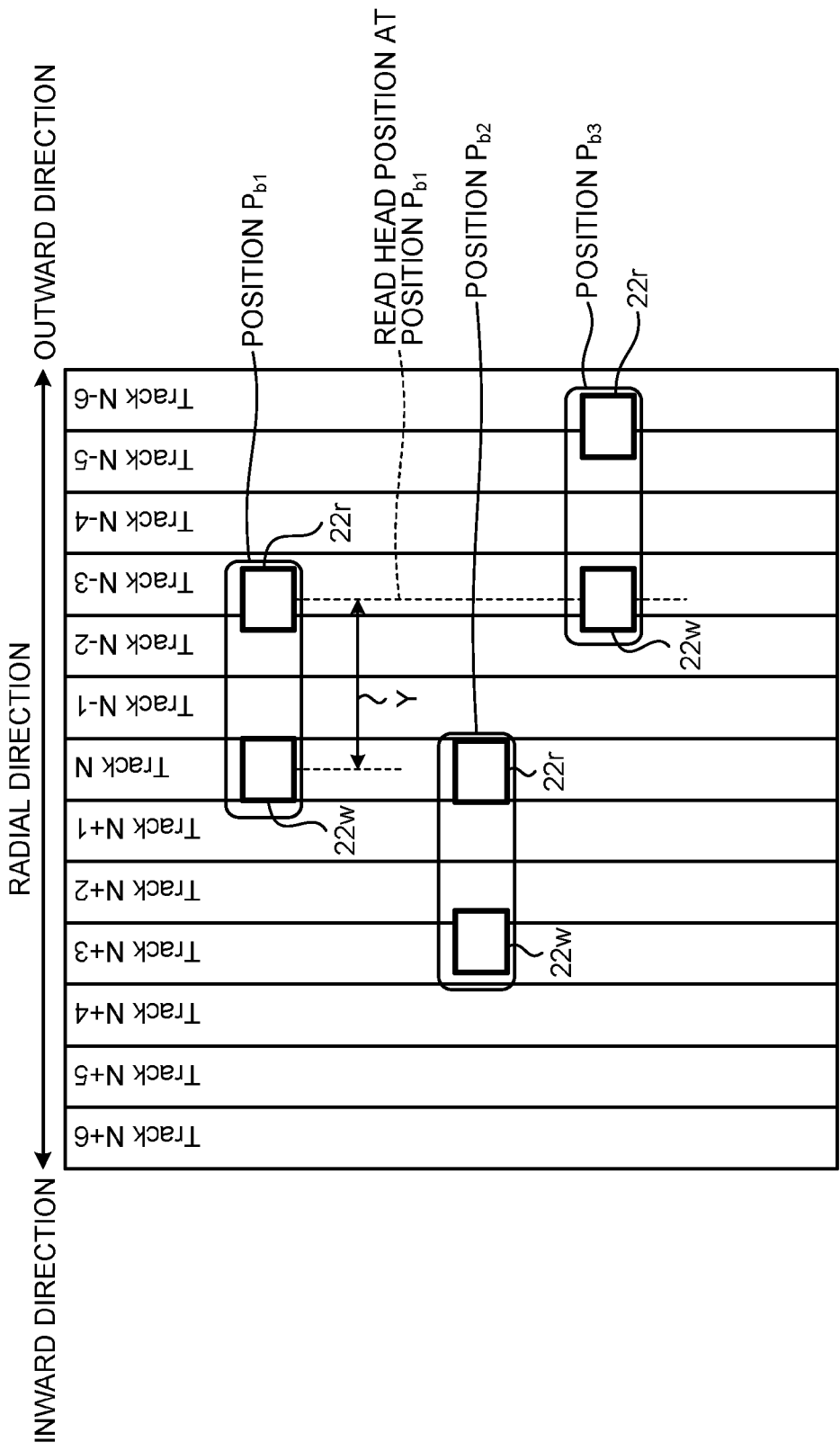
FIG. 5 is a schematic view for describing an example of a position of the magnetic head in various operations of the embodiment.

FIG. 5 is a schematic view for describing an example of a position of the magnetic head 22 in various operations of the embodiment. In the drawing, a case where the distance between head positions Y is non-zero will be described. In addition, thirteen tracks arranged in the radial direction, that is, tracks N−6 to N+6, and positions $P_{b1}$ to $P_{b3}$ of the magnetic head 22 during various operations are illustrated in the drawing.

For example, when data is written to a track N, the magnetic head 22 is positioned at the position $P_{b1}$ such that the write head 22w is located on the track N.

In addition, when data is read from the track N, the magnetic head 22 is positioned at the position $P_{b2}$ such that the read head 22r is located on the track N.

Correction information of a radial position around the track N is learned using the read head 22r at the position $P_{b1}$ in order to improve positioning accuracy when data is written to the track N. The correction information obtained in this manner is written to the magnetic disk 11 using the write head 22w in a state where the magnetic head 22 is positioned at the position $P_{b3}$ so as to be acquired by the read head 22r when the write head 22w is located around the track N.

Incidentally, positions at which the correction information is learned (learning positions to be described later) are set in the radial direction at granularity irrelevant to an interval between tracks. At a radial position between two learning positions, the magnetic disk device 1 can perform positioning control, for example, by interpolating correction results at the two learning positions, respectively.

Figure 6:
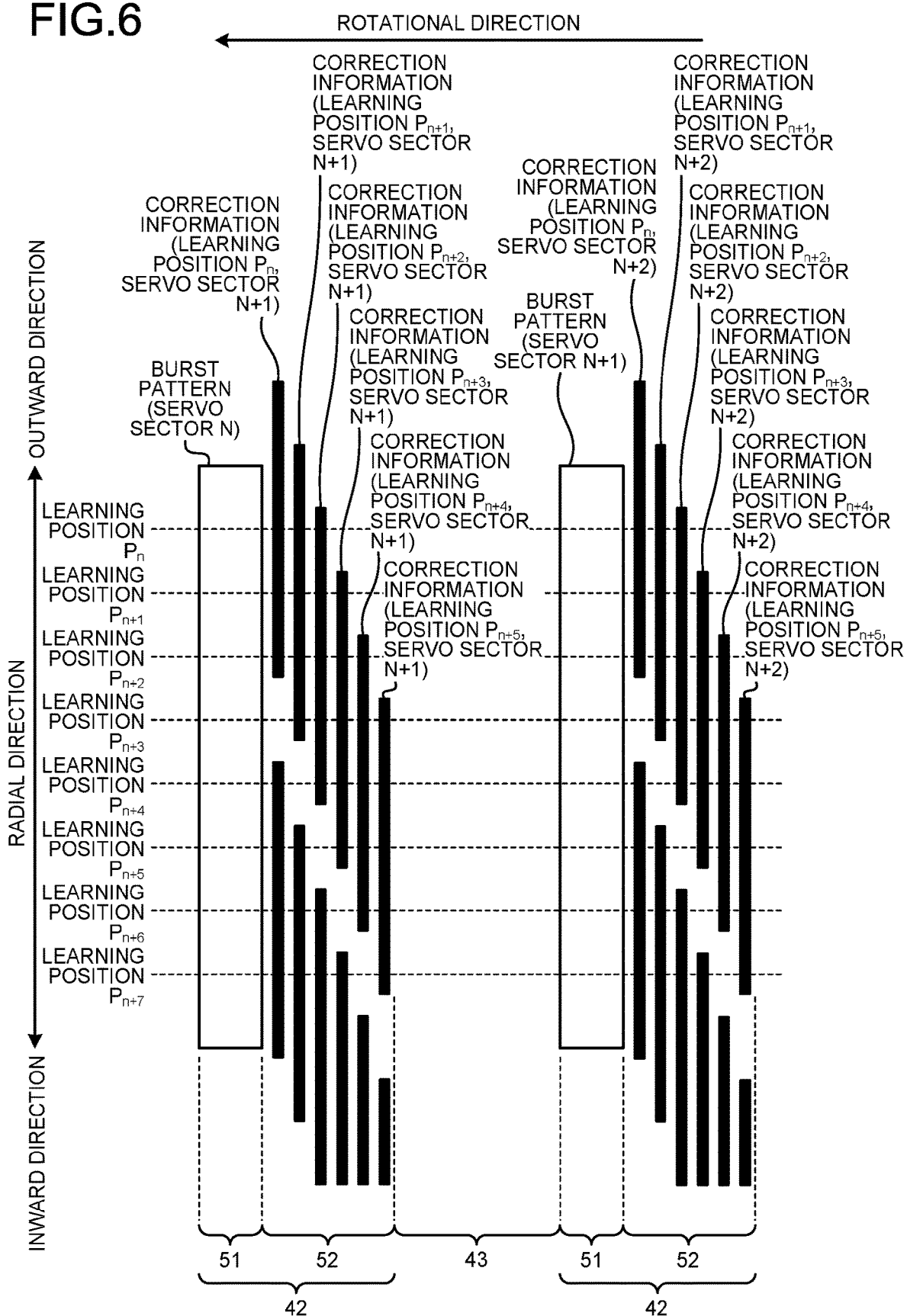
FIG. 6 is a schematic view illustrating details of an example of an arrangement method of correction information of the embodiment.

FIG. 6 is a schematic view illustrating details of an example of an arrangement method of correction information of the embodiment.

The learning of correction information is executed at a plurality of radial positions. A radial position where the correction information is learned is referred to as a learning position. A plurality of learning positions are set in the radial direction of the magnetic disk 11, and the learning of correction information is executed in a state where the read head 22r is positioned at each learning position.

FIG. 6 illustrates eight learning positions $P_n$ to $P_{n+7}$ among the plurality of learning positions set in the radial direction. In addition, the servo area 42 of a servo sector N and the servo area 42 of a servo sector$_{N+1}$ adjacent to the servo sector N are illustrated.

Each of the servo areas 42 includes a burst pattern area 51 and a post code area 52. In each of the burst pattern areas 51, a burst pattern used in positioning control in the servo sector 44 to which the burst pattern area belongs is written. Incidentally, description regarding the sector/cylinder information is omitted herein. In each of the post code areas 52, correction information used in positioning control in the servo sector 44 through which the magnetic head 22 passes next to the servo sector 44 to which the post code area belongs is written for each learning position. As a result, in each of the servo sectors 44, the magnetic disk device 1 can use the correction information, read from the immediately previous servo sector 44 that has passed, for the positioning control.

In addition, the plurality of learning positions are grouped for every six consecutive learning positions. Six pieces of correction information corresponding to the six learning positions (for example, learning positions $P_n$ to $P_{n+5}$ of the servo sector N) belonging to one group are written so as to be arranged in the post code area 52 in the circumferential direction. Further, each of the six pieces of correction information is written in a rectangular area extending in the radial direction with a corresponding learning position as a center. As a result, positions where the six pieces of correction information are written are shifted little by little in the radial direction.

The group of the six learning positions is referred to as a learning position set. In addition, the six pieces of correction information corresponding to the six learning positions constituting the learning position set are referred to as a correction information set. Incidentally, the number of learning positions constituting the learning position set is not limited to six. Similarly, the number of pieces of correction information constituting the correction information set is not limited to six.

In addition, a plurality of correction information sets are written so as to be arranged in the radial direction. More specifically, when each correction information set is constituted by six post codes, correction information corresponding to a learning position $P_{x+5}$ is arranged next to correction information corresponding to a learning position $P_x$ in the radial direction. The x is an arbitrary integer.

According to the above-described arrangement method, each piece of correction information is written in a range wider than an interval between learning positions in the radial direction. Thus, when correction information corresponding to a target learning position is read, the correction information corresponding to the target learning position can be read even if a position of the read head 22r slightly deviates in the radial direction from the target learning position.

Hereinafter, a position and a shape of an area at which one piece of correction information is written in the magnetic disk 11 are sometimes referred to as a write pattern. In addition, a width of the write pattern in the radial direction is sometimes referred to as a write pattern width.

Incidentally, the arrangement method of the correction information is not limited to the example illustrated in FIG. 6.

Figure 7:
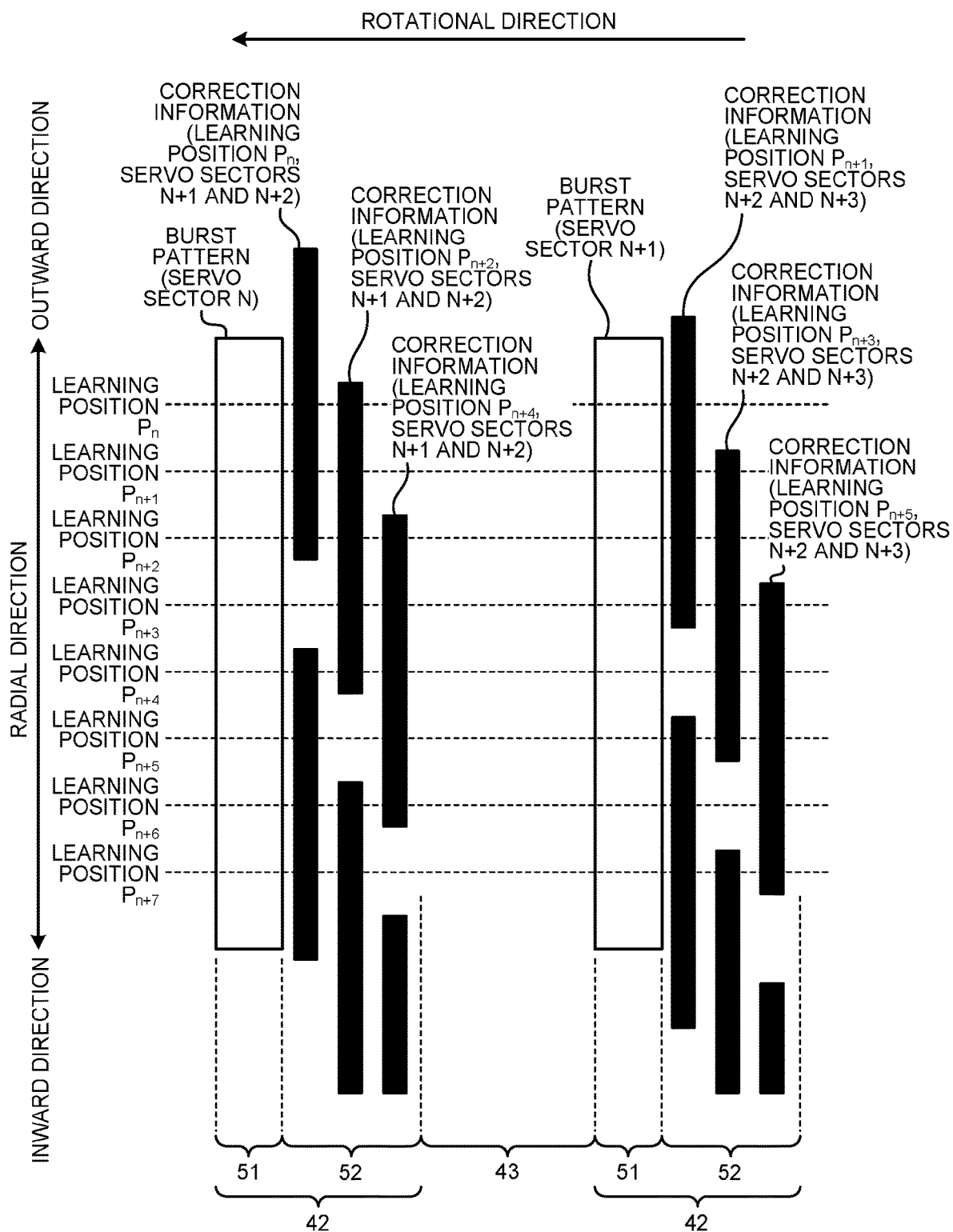
FIG. 7 is a schematic view illustrating details of another example of the arrangement method of the correction information of the embodiment.

FIG. 7 is a schematic view illustrating details of another example of the arrangement method of the correction information according to the embodiment.

In the example illustrated in FIG. 7, one correction information set is written to be divided into the two servo sectors 44. Specifically, among six pieces of correction information constituting one correction information set, pieces of correction information related to the learning positions $P_n$, $P_{n+2}$, and $P_{n+4}$ are written in the post code area 52 of the servo sector N, and pieces of correction information related to the learning positions $P_{n+1}$, $P_{n+3}$, and $P_{n+5}$ are written in the post code area 52 of the servo sector$_{N+1}$. Further, all the pieces of correction information written in the post code area 52 of the servo sector N are used in positioning control in the servo sector$_{N+1}$ and the servo sector$_{N+2}$. All the pieces of correction information written in the post code area 52 of the servo sector$_{N+1}$ are used in positioning control in the servo sector$_{N+2}$ and the servo sector$_{N+3}$.

In this manner, the plurality of pieces of correction information constituting one correction information set may be distributed to the plurality of servo sectors 44.

Figure 8:
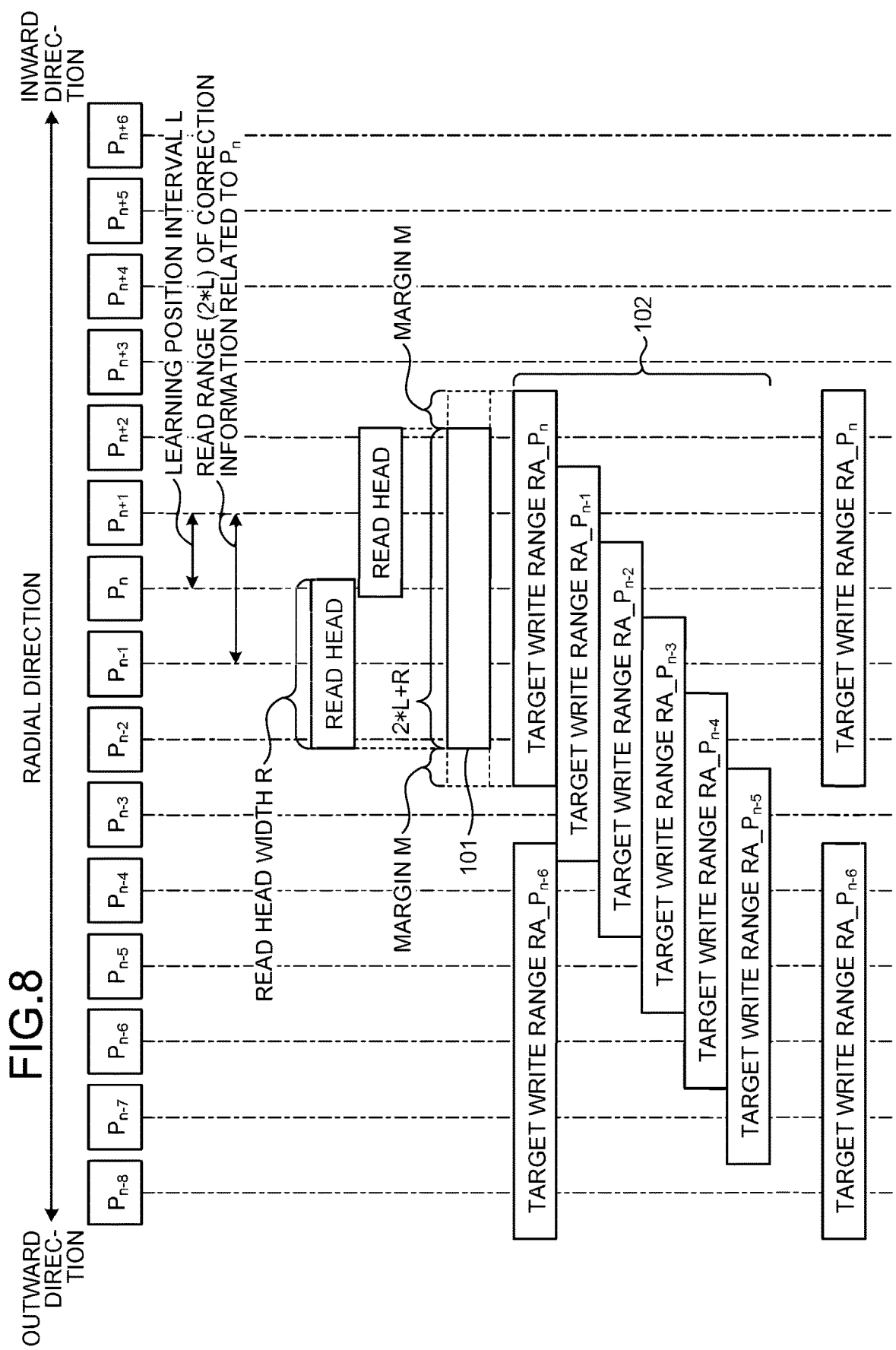
FIG. 8 is a view for describing a write range of the correction information according to the embodiment.

FIG. 8 is a view for describing a write range of the correction information according to the embodiment. Here, as an example, the write range of the correction information related to the learning position $P_n$ will be described. Incidentally, an interval between learning positions is denoted by L, and a width of the read head 22r in the radial direction is denoted by R.

There is a demand that the correction information related to the learning position $P_n$ can be read even if the read head 22r passes over a position shifted by L in the radial direction with the learning position $P_n$ as a center. In order to satisfy such a demand, it is necessary to write the correction information related to the learning position $P_n$ so as to include a range (range 101 in FIG. 8) having a width of 2*L+R with the learning position $P_n$ as the center.

In practice, the magnetic head 22 may slightly fluctuate in the radial direction when the correction information is written. Thus, an area, obtained by adding a margin M to both ends of the range 101, that is, a range having a width of 2*L+R+2M with the learning position $P_n$ as the center is set as a target write range RA_$P_n$ of the correction information related to the learning position $P_n$. Target write ranges RA of correction information related to other learning positions are also set by the same method as described above.

Incidentally, for example, when the arrangement method of the correction information illustrated in FIG. 6 is adopted, the target write range RA_$P_n$ of the correction information related to the learning position $P_n$, a target write range RA_$P_{n+1}$ of the correction information related to the learning position $P_{n+1}$, and a target write range RA_$P_{n+2}$ of the correction information related to the learning position $P_{n+2}$, a target write range RA_$P_{n+3}$ of the correction information related to the learning position $P_{n+3}$, a target write range RA_$P_{n+4}$ of the correction information related to the learning position $P_{n+4}$, and a target write range RA_$P_{n+5}$ of the correction information related to the learning position $P_{n+5}$ are set to be shifted each by L in the radial direction as illustrated in a setting example 102. Further, a target write range RA_$P_{n+6}$ of correction information related to a learning position $P_{n+6}$ is set next to the target write range RA_$P_n$ of the correction information related to the learning position $P_n$ in the radial direction with an interval.

Here, a technique to be compared with the embodiment will be described. This technique is referred to as a comparative example. According to the comparative example, a magnetic disk device moves a magnetic head to a certain radial position to execute learning of correction information. Thereafter, the magnetic disk device moves the magnetic head such that a write head is located at a position of a read head when the learning of the correction information is executed, and executes writing of the correction information. Thereafter, the magnetic disk device starts learning of correction information at the next radial position. The magnetic disk device serially executes a pair of learning of correction information and writing of correction information with respect to a plurality of learning positions.

In this manner, the writing of the correction information is not executed during an execution period of the learning of the correction information, and the learning of the correction information is not executed during an execution period of the writing of the correction information, according to the comparative example. Since the learning of the correction information and the writing of the correction information are executed in different periods, it takes much time to learn and write the correction information according to the comparative example.

According to the embodiment, the magnetic disk device 1 is configured to be capable of executing the learning of the correction information and the writing of the correction information in the same period. More specifically, the magnetic disk device 1 writes, while learning the correction information using the read head 22r at a certain learning position, the correction information related to another learning position, which has been already obtained, using the write head 22w. That is, learning of correction information related to a certain learning position and writing of a learning value of correction information related to another learning position are executed in parallel. Incidentally, execution of processing X and processing Y in parallel means that at least a part of an execution period of the processing X overlaps with an execution period of the processing Y. A start timing of the execution period of the processing X may or does not necessarily coincide with a start timing of the execution period of the processing Y. An end timing of the execution period of the processing X may or does not necessarily coincide with an end timing of the execution period of the processing Y.

Thus, according to the embodiment, the time required for learning and writing the correction information is shortened as compared with the comparative example in which the learning of the correction information and the writing of the correction information are executed in different periods.

Hereinafter, a process of executing writing of a learning value of correction information at a certain learning position in parallel with learning of correction information at another learning position will be referred to as parallel processing.

Figure 9:
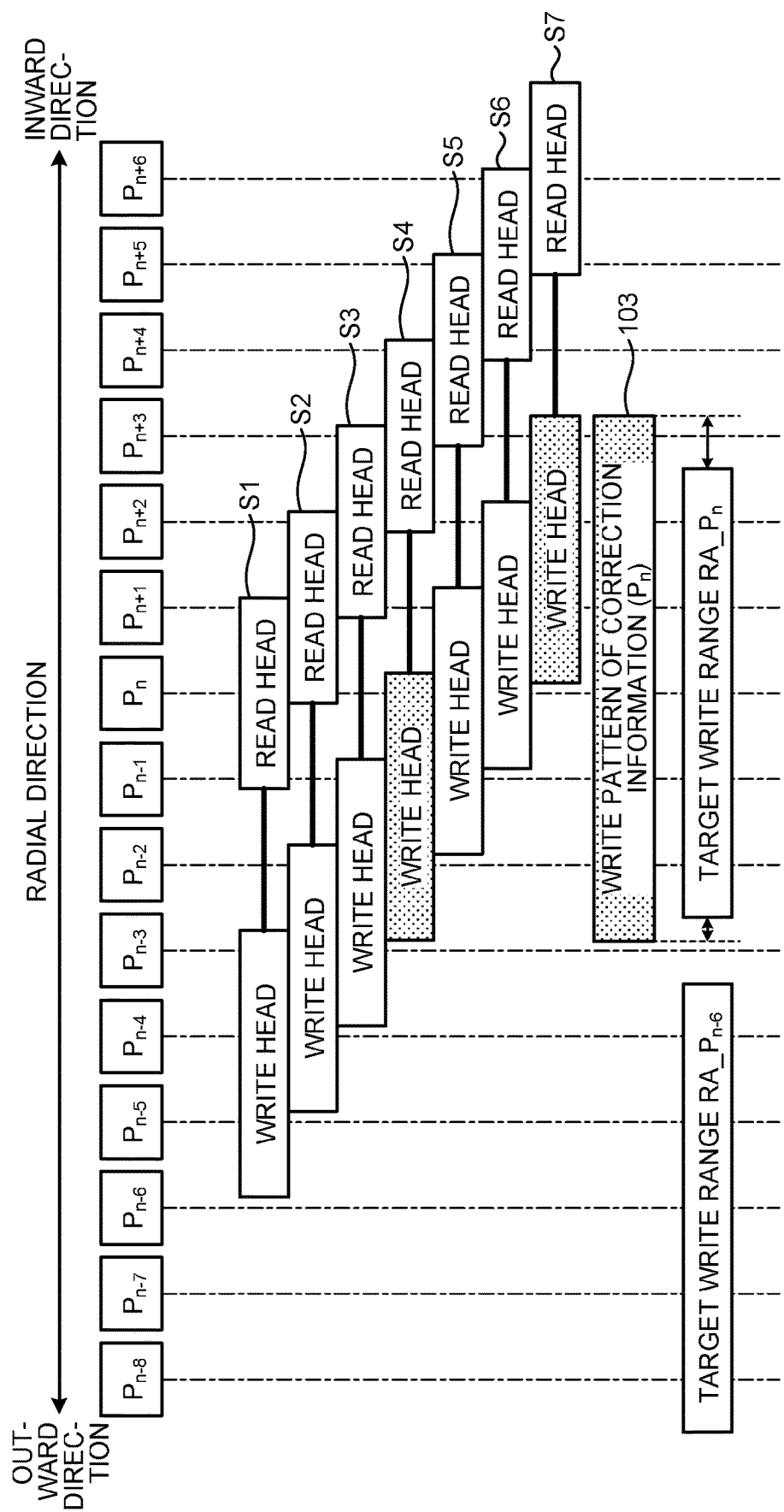
FIG. 9 is a view for describing parallel processing according to the embodiment.

FIG. 9 is a view for describing parallel processing according to the embodiment. Here, as an example, the parallel processing at the time of writing the correction information related to the learning position $P_n$ will be described.

In the embodiment, when the distance between head positions Y is non-zero, writing of correction information is executed while moving the magnetic head 22 in a direction in which the read head 22r precedes the write head 22w. For example, in the inner area $A_{inner}$ illustrated in FIG. 4, the magnetic head 22 is moved from the innermost peripheral side of the magnetic disk 11 toward the position $P_{a1}$, that is, in the outward direction. In addition, in the outer area $A_{outer}$ illustrated in FIG. 4, the magnetic head 22 is moved from the outermost peripheral side of the magnetic disk 11 toward the position $P_{a1}$, that is, in the inward direction.

The parallel processing executed in the outer area $A_{outer}$ will be described in FIG. 9. That is, the magnetic head 22 is moved in the inward direction, and learning and writing of correction information are sequentially executed in the inward direction.

First, seek control of moving the magnetic head 22 such that the read head 22r is located at the learning position $P_n$ is executed, and learning of correction information related to the learning position $P_n$ using the read head 22r is executed after the seek control (S1).

Subsequently, seek control of moving the magnetic head 22 such that the read head 22r is located at the learning position $P_{n+1}$ is executed, and learning of correction information related to the learning position $P_{n+1}$ using the read head 22r is executed after the seek control (S2). That is, the magnetic disk device 1 reads a burst pattern at the learning position $P_{n+1}$ by the read head 22r, and calculates the correction information related to the learning position $P_{n+1}$ based on the read burst pattern.

Subsequently, seek control of moving the magnetic head 22 such that the read head 22r is located at the learning position $P_{n+2}$ is executed, and learning of correction information related to the learning position $P_{n+2}$ using the read head 22r is executed after the seek control (S3).

Subsequently, seek control of moving the magnetic head 22 such that the read head 22r is located at the learning position $P_{n+3}$ is executed, and learning of correction information related to the learning position $P_{n+3}$ using the read head 22r is executed after the seek control (S4).

When the read head 22r is located on the learning position $P_{n+3}$, the write head 22w passes through a part of the target write range RA_$P_n$ on the inner side without passing over a target write range RA_$P_{n-6}$. That is, it is possible to write the correction information related to the learning position $P_n$ without causing the correction information already written in the target write range RA_$P_{n-6}$ to be lost from the target write range RA_$P_{n-6}$ by overwriting the correction information related to the learning position $P_n$. Therefore, writing of the correction information related to the learning position $P_n$ is executed together with learning of the correction information related to the learning position $P_{n+3}$ in S4 in which the read head 22r is controlled to be located on the learning position $P_{n+3}$.

Subsequently, seek control of moving the magnetic head 22 such that the read head 22r is located at the learning position $P_{n+4}$ is executed, and learning of correction information related to the learning position $P_{n+4}$ using the read head 22r is executed after the seek control (S5).

Subsequently, seek control of moving the magnetic head 22 such that the read head 22r is located at the learning position $P_{n+5}$ is executed, and learning of correction information related to the learning position $P_{n+5}$ using the read head 22r is executed after the seek control (S6).

Subsequently, seek control of moving the magnetic head 22 such that the read head 22r is located at the learning position $P_{n+6}$ is executed, and learning of correction information related to the learning position $P_{n+6}$ using the read head 22r is executed after the seek control (S7).

When the read head 22r is located on the learning position $P_{n+6}$, the write head 22w passes through an area including all of remaining portions of the target write range RA_$P_n$, in other words, portions of the target write range RA_$P_n$ where writing of correction information has not been performed yet. That is, it is possible to write the correction information in the remaining portions of the target write range RA_$P_n$. Therefore, writing of the correction information related to the learning position $P_n$ is executed together with learning of the correction information related to the learning position $P_{n+6}$ in S7 in which the read head 22r is controlled to be located on the learning position $P_{n+6}$.

In this manner, the correction information related to the learning position $P_n$ is written to the magnetic disk 11 at the time of learning of the correction information related to the learning position $P_{n+3}$ and at the time of learning of the correction information related to the learning position $P_{n+6}$. As a result, the correction information related to the learning position $P_n$ is not overwritten on correction information related to a learning position $P_{n-6}$, which has already been written in the target write range RA_$P_{n-6}$, and a write pattern 103 of the correction information related to the learning position $P_n$ can be formed in a range including the target write range RA_$P_n$.

As described above, the distance between head positions Y changes depending on the radial position of the magnetic head 22. Thus, there may be a case where a portion where no correction information is written remains at an end on the opposite side to the moving direction of the magnetic head 22 between two ends of a target write range RA depending on a radial position where the target write range RA is provided. In addition, there may be a case where correction information already written in an adjacent target write range RA is erased by overwriting if an attempt is made to write correction information so as not to leave the portion where no correction information is written at the end opposite to the moving direction of the magnetic head 22 between the two ends of the target write range RA. In order to prevent such cases, an interval between the target write ranges RA in the radial direction needs to be larger than the interval L between learning positions. In addition, when one learning position set is constituted by six learning positions, a width of one target write range needs to be 6L or less. Thus, the following Formula (1) needs to be satisfied.

$$2*L+R+2*M+L<6*L \quad (1)$$

When Formula (1) is transformed, Formula (2) is derived.

$$R<3*L-2*M \quad (2)$$

That is, as L, it is necessary to set a large value to some extent. If a large value is set as L, however, there is a case where positioning accuracy deteriorates, or correction information is discontinuously written in one target write range.

Therefore, in the embodiment, a value of L is set such that an end on the opposite side to the moving direction of the magnetic head 22 between two ends of a target write range coincides with an end of a range through which the write head 22w passes at the time of the first writing between two times of writing of correction information to the target write range. As a result, it is unnecessary to set the interval between the target write ranges RA in the radial direction.

FIG. 10 is a view for describing a method of setting a value of L according to the embodiment.

An area having a width of 2L+R+2M with the learning position $P_n$ as a center is set as the target write range RA_$P_n$. When the correction information related to the learning position $P_n$ is learned, the magnetic head 22 is controlled such that the read head 22r (more precisely, the center of the read head 22r) is located at the learning position $P_n$. Further, between two ends of the target write range RA_$P_n$, an end on the side opposite to the moving direction of the magnetic head 22, that is, an end on the outer side of the target write range RA_$P_n$ in the example illustrated in FIG. 10 is separated outward from the center of the learning position $P_n$ by L1 expressed by the following Formula (3).

$$L1=L+R/2+M \quad (3)$$

Next, a case where the first writing of the correction information related to the learning position $P_n$ is performed when correction information related to a learning position $P_{n+D}$ is learned will be considered. D is a positive integer. In a case where the magnetic head 22 is controlled such that the read head 22r is located at the learning position $P_{n+D}$, an end on the outer side of the write head 22w is separated outward from the learning position $P_n$ by L2 expressed by the following Formula (4).

$$L2=Y+W/2-X \quad (4)$$

In Formula (4), W is a width of the write head 22w in the radial direction. In addition, X is a distance between the learning position $P_n$ and the learning position $P_{n+D}$. X is expressed by the following Formula (5).

$$X=D*L \quad (5)$$

The following Formula (6) needs to be satisfied in order to make L1 and L2 coincide with each other.

$$L1=L2 \quad (6)$$

If Formula (3) and Formula (4) are substituted into Formula (6), the following Formula (7) is derived.

$$L+R/2+M=Y+W/2-X \quad (7)$$

If Formula (7) is transformed by substituting Formula (5), Formula (8) is derived.

$$L=(Y-M+(W-R)/2)/(D+1) \quad (8)$$

When one learning position set is constituted by six learning positions, a width of one target write range RA needs to be 6L or less. That is, the following Formula (9) needs to be satisfied.

$$6*L>2*L+R+2*M \quad (9)$$

If Formula (9) is transformed, the following Formula (10) is derived.

$$L>(R+2*M)/4 \quad (10)$$

The magnetic disk device 1 sets a value of L and a value of D such that Formula (8) and Formula (10) are satisfied together.

M is a fixed value. In addition, Y, W, and R are uniquely determined depending on a radial position. As M, Y, W, and R are determined, the magnetic disk device 1 can calculate the set value of L and the set value of D based on Formula (8) and Formula (10).

In the example illustrated in FIG. 10, "4" is set as the value of D for satisfying Formula (8) and Formula (10) together. Thus, the set value of L is defined by substituting "4" for D in Formula (8).

Once the value of D is set, the magnetic disk device 1 executes learning at consecutive D learning positions without changing the set value of D and the set value of L. Thereafter, the set value of D and the set value of L are updated.

That is, according to the example illustrated in FIG. 10, the magnetic disk device 1 sets a position separated from the learning position $P_n$ by L to the inner side as the learning position $P_{n+1}$, sets a position separated from the learning position $P_n$ by 2*L to the inner side as the learning position $P_{n+2}$, sets a position separated from the learning position $P_n$ by 3*L to the inner side as the learning position $P_{n+3}$, and sets a position separated from the learning position $P_n$ by 4*L to the inner side as the learning position $P_{n+4}$. Further, the set value of D and the set value of L are updated at the learning position $P_{n+4}$.

Further, in a case where the set value of D when learning is performed before a learning position $P_{n-1}$ is a value equal to the value of D set at the learning position $P_n$, that is, "4", the magnetic disk device 1 executes the parallel processing during learning at each of the learning positions $P_n$ to $P_{n+4}$.

For example, the magnetic disk device 1 executes learning of the correction information related to the learning position $P_n$ in a state where the magnetic head 22 is controlled such that the read head 22r is located on the learning position $P_n$. In parallel with the learning of the correction information related to the learning position $P_n$, the magnetic disk device 1 executes writing of correction information related to a learning position $P_{n-4}$ and writing of correction information related to a learning position $P_{n-7}$ (S11).

Further, the magnetic disk device 1 executes learning of the correction information related to the learning position $P_{n+1}$ in a state where the magnetic head 22 is controlled such that the read head 22r is located on the learning position $P_{n+1}$. In parallel with the learning of the correction information related to the learning position $P_{n+1}$, the magnetic disk device 1 executes writing of correction information related to a learning position $P_{n-3}$ and writing of correction information related to a learning position $P_{n-6}$ (S12).

Further, the magnetic disk device 1 executes learning of the correction information related to the learning position $P_{n+2}$ in a state where the magnetic head 22 is controlled such that the read head 22r is located on the learning position $P_{n+2}$. In parallel with the learning of the correction information related to the learning position $P_{n+2}$, the magnetic disk device 1 executes writing of correction information related to a learning position $P_{n-2}$ and writing of correction information related to a learning position $P_{n-5}$ (S13).

Further, the magnetic disk device 1 executes learning of the correction information related to the learning position $P_{n+3}$ in a state where the magnetic head 22 is controlled such that the read head 22r is located on the learning position $P_{n+3}$. In parallel with the learning of the correction information related to the learning position $P_{n+3}$, the magnetic disk device 1 executes writing of correction information related to the learning position $P_{n-1}$ and writing of the correction information related to the learning position $P_{n-4}$ (S14).

Further, the magnetic disk device 1 executes learning of the correction information related to the learning position $P_{n+4}$ in a state where the magnetic head 22 is controlled such that the read head 22r is located on the learning position $P_{n+4}$. In parallel with the learning of the correction information related to the learning position $P_{n+4}$, the magnetic disk device 1 executes writing of the correction information related to the learning position $P_n$ and writing of the correction information related to the learning position $P_{n-3}$ (S15). In addition, the magnetic disk device 1 updates the set value of D and the set value of L in S15.

A more detailed description of the operation of the magnetic disk device 1 will be described later.

Incidentally, a condition regarding L is not limited to the example illustrated in Formula (10). For example, regarding L, a lower limit value $L_{min}$ and an upper limit value $L_{max}$ may be set, and the set value of L and the set value of D may be calculated such that the following Formula (11) is satisfied.

$$(R+2*M)/4 < L_{min} \le L \le L_{max} \tag{11}$$

Incidentally, a condition configured by a logical product of the condition of Formula (8) and the condition of Formula (11) is referred to as a parallel processing condition. Incidentally, the parallel processing condition is not limited thereto. A condition configured by a logical product of the condition of Formula (8) and the condition of Formula (10) may be set as the parallel processing condition.

FIG. 11A is a graph illustrating a relationship between the value of L and the value of Y calculated based on Formula (8) of the embodiment. In the graph, the horizontal axis represents the value of Y, and the vertical axis represents the value of L. Further, the relationship between the value of L and the value of Y is drawn for each value of D. It can be understood from the drawing that D decreases and a gradient of the relationship between the value of L and the value of Y becomes steep as Y decreases. On the contrary, it can be understood that D increases and the gradient of the relationship between the value of L and the value of Y becomes gentle as Y increases.

Figure 11B:
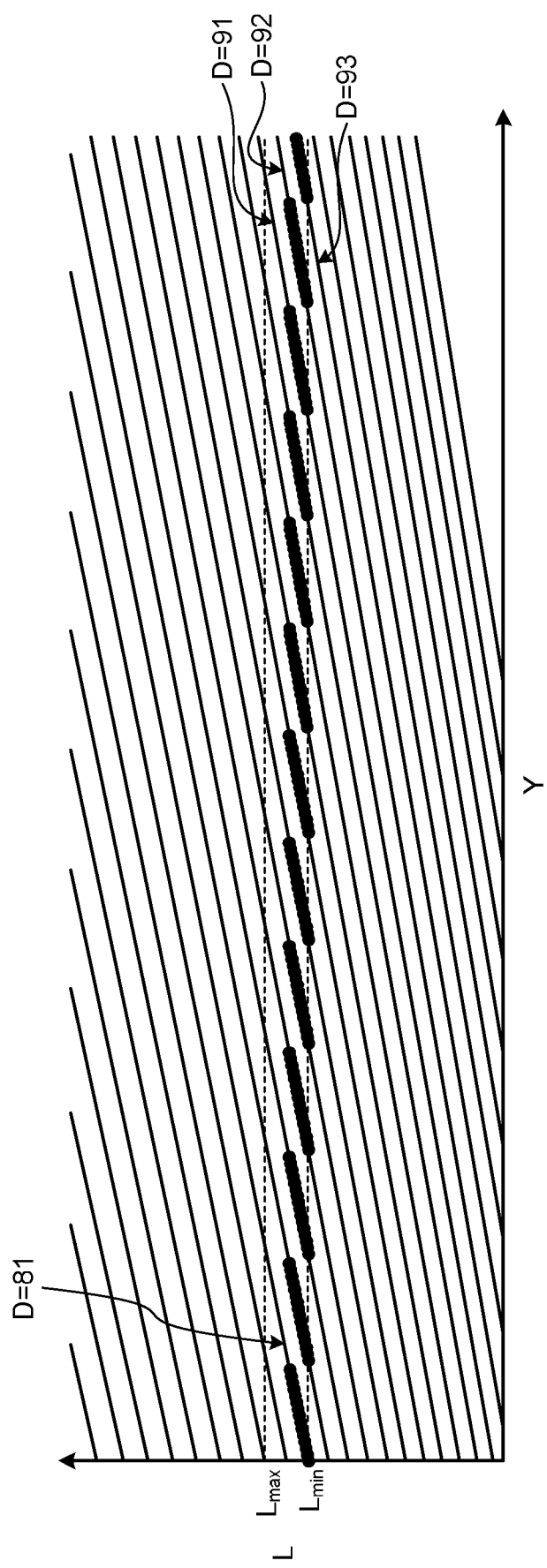
FIG. 11B is an enlarged graph of an area 104 where the value of Y is large in the graph illustrated in FIG. 11A.

FIG. 11B is an enlarged graph of an area 104 where the value of Y is large in the graph illustrated in FIG. 11A. In this example, the magnetic disk device 1 calculates the set value of L and the set value of D such that L is as small as possible in a range from the lower limit value $L_{min}$ to the upper limit value $L_{max}$. Each dot drawn in the graph of FIG. 11B indicates a pair of the set value of L and the set value of D calculated by the magnetic disk device 1.

In an area where the gradient of the relationship between the value of L and the value of Y for each value of D is gentle as in the area 104, it is possible to calculate a pair of the set value of L and the set value of D so as to satisfy the condition of Formula (11) regardless of the value of Y. However, for example, in an area 105 where the value of Y in the graph of FIG. 11A is close to zero, the gradient of the relationship between the value of L and the value of Y becomes steep, and thus, there occurs a case where it is difficult to obtain a pair of the set value of L and the set value of D that satisfy the condition of Formula (11).

In the embodiment, the magnetic disk device 1 determines whether the parallel processing condition is satisfied. When the parallel processing condition is satisfied, the magnetic disk device 1 executes the parallel processing. When the parallel processing condition is not satisfied, the magnetic disk device 1 executes the processing described as the comparative example, for example, without executing the parallel processing.

That is, the magnetic disk device 1 executes the parallel processing in an area where the value of Y is sufficiently large (for example, the area 104). In an area where the value of Y is zero or close to zero (for example, the area 105), the magnetic disk device 1 does not execute the parallel processing but executes the processing described as the comparative example.

Figure 12A:
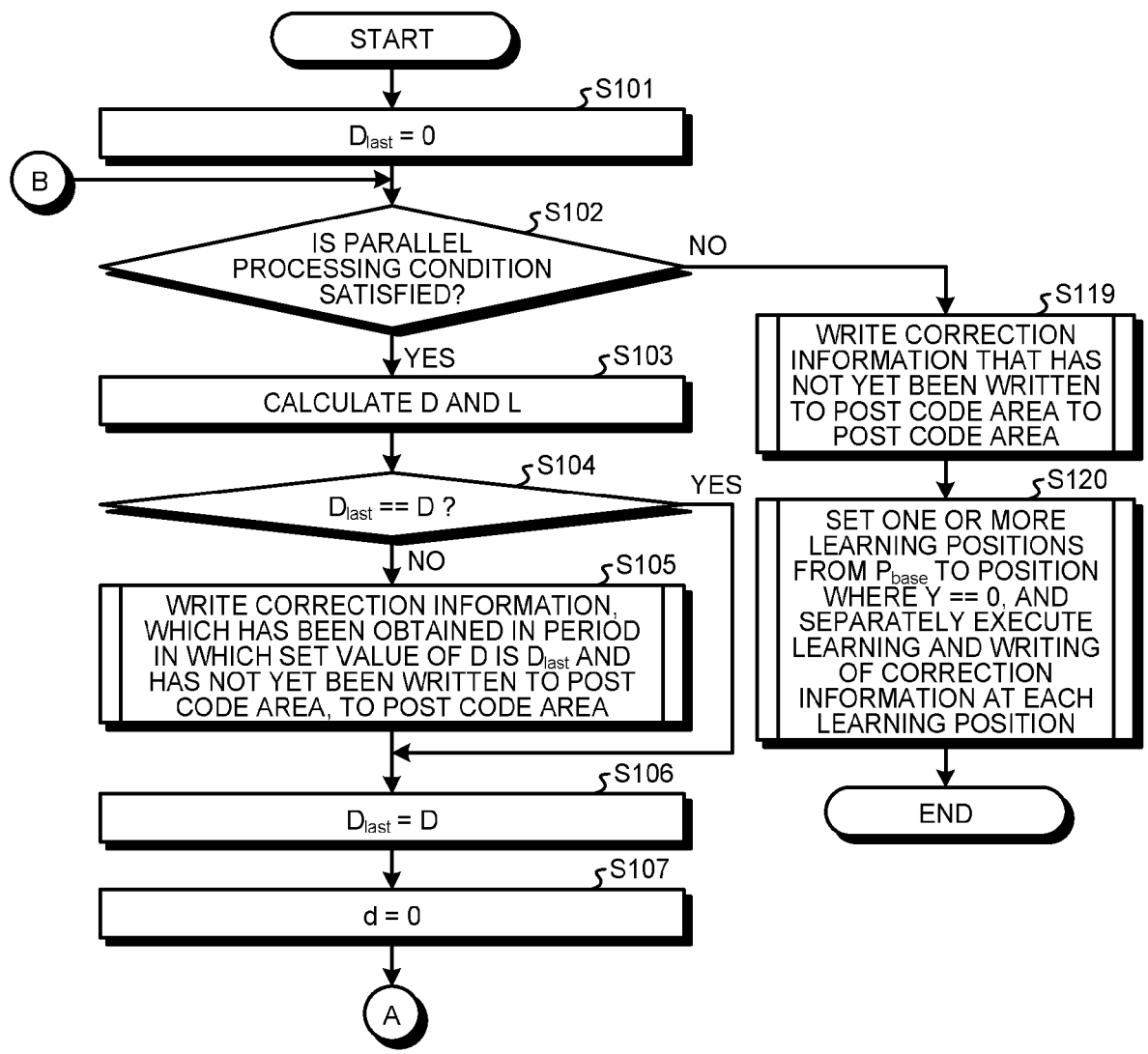
FIG. 12A is a flowchart illustrating examples of operations according to the embodiment of learning and writing of the correction information.
Figure 12B:
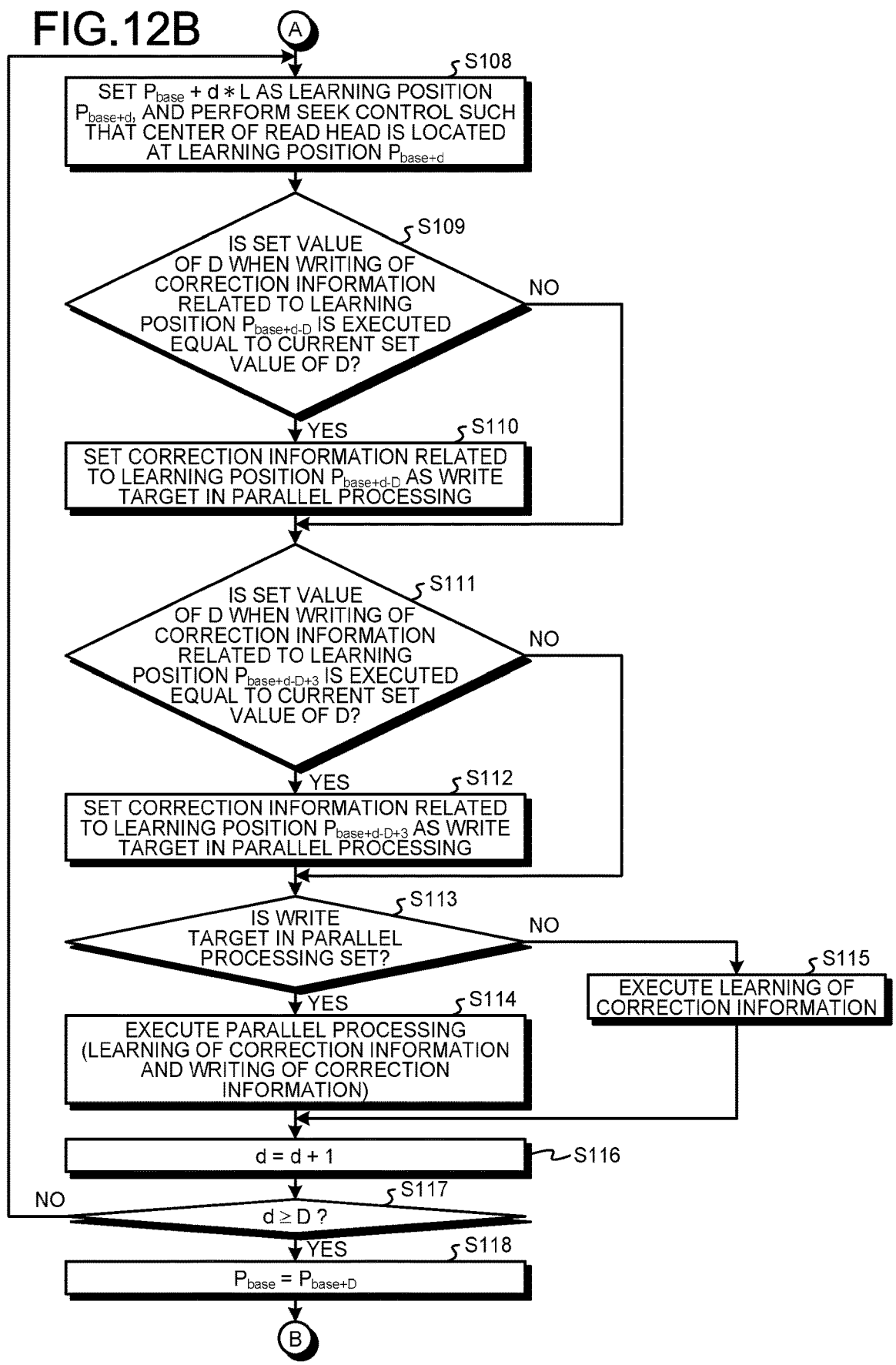
FIG. 12B is a flowchart illustrating examples of operations according to the embodiment of learning and writing of the correction information.

FIGS. 12A and 12B are flowcharts illustrating examples of operations according to the embodiment of learning and writing of correction information. In the example illustrated in the drawing, it is assumed that, when the first writing of the correction information is executed in a certain target write range by the parallel processing during learning at the learning position $P_x$, the second writing of the correction information to the target write range is executed in the parallel processing during learning at a learning position $P_{x+3}$ in order to simplify the description. Incidentally, x is a positive integer.

In addition, a series of processes illustrated in this drawing is executed while moving the magnetic head 22 in a direction in which the read head 22r precedes the write head 22w. According to the description illustrated in FIG. 4, the magnetic head 22 is moved from the innermost peripheral side of the magnetic disk 11 toward the position $P_{a1}$ in the inner area $A_{inner}$ in which the read head 22r is located outward of the write head 22w. The magnetic head 22 is moved from the outermost peripheral side of the magnetic disk 11 toward the position $P_{a1}$ in the outer area $A_{outer}$ in which the read head 22r is located inward of the write head 22w. In each of the inner area $A_{inner}$ and the outer area $A_{outer}$, a series of operations illustrated in FIG. 12 is executed.

First, the controller 30 (for example, the processor 26) initializes a variable $D_{last}$ to zero (S101). $D_{last}$ is the variable for storing the latest set value of D.

Subsequently, the controller 30 determines whether the parallel processing condition is satisfied at a reference learning position $P_{base}$ (S102).

The reference learning position $P_{base}$ is any one of a plurality of learning positions and can be updated in the series of operations illustrated in FIG. 12. In the inner area $A_{inner}$, a learning position on the innermost peripheral side of the inner area $A_{inner}$ is set as an initial reference learning position $P_{base}$. In the outer area $A_{outer}$, a learning position on the outermost peripheral side of the outer area Acuter is set as an initial reference learning position $P_{base}$.

In S102, the controller 30 calculates the respective values of M, Y, W, and R in a case where the read head 22r is located at the radial position $P_{base}$, for example. Further, the controller 30 substitutes these calculated values into a mathematical expression defining the parallel processing condition, for example, Formula (8) and Formula (11), and determines whether there are a value of D and a value of L that satisfy both the condition of Formula (8) and the condition of Formula (11). When the value of D and the value of L that satisfy both the condition of Formula (8) and the condition of Formula (11) exist, the controller 30 determines that the parallel processing condition is satisfied. When the value of D and the value of L that satisfy both the condition of Formula (8) and the condition of Formula (11) do not exist, the controller 30 determines that the parallel processing condition is not satisfied. Incidentally, the parallel processing condition is not limited thereto as described above.

When the parallel processing condition is satisfied (S102: Yes), the controller 30 calculates a new set value of D and a new set value of L based on the parallel processing condition (S103).

Further, the controller 30 determines whether the new set value of D is equal to a value stored as $D_{last}$ (S104). When the new set value of D is equal to the value stored as $D_{last}$ (S104: Yes), the controller 30 updates the value of $D_{last}$ with the new set value of D (S106). Further, the controller 30 initializes a variable d to zero (S107).

The variable d is a loop counter used in the loop processing from S108 to S107, and can take an integer from zero to D.

The controller 30 sets a radial position of $P_{base}+d*L$ as a learning position $P_{base+d}$ and performs seek control such that the read head 22r is located at the learning position $P_{base+d}$ (S108).

Further, the controller 30 determines whether a set value of D when writing of correction information related to a learning position $P_{base+d-D}$ is executed is equal to a current set value of D (S109).

When the set value of D when the writing of the correction information related to the learning position $P_{base+d-D}$ is executed is equal to the current set value of D (S109: Yes), the controller 30 sets the correction information related to the learning position $P_{base+d-D}$ as a write target in the parallel processing (S110). When the set value of D when the writing of the correction information related to the learning position $P_{base+d-D}$ is executed is different from the current set value of D (S109: No), the process of S110 is skipped.

Subsequently, the controller 30 determines whether a set value of D when writing of correction information related to a learning position $P_{base+d-D+3}$ is executed is equal to a current set value of D (Sill).

When the set value of D when the writing of the correction information related to the learning position $P_{base+d-D+3}$ is executed is equal to the current set value of D (S111: Yes), the controller 30 sets the correction information related to the learning position $P_{base+d-D+3}$ as a write target in the parallel processing (S112). When the set value of D when the writing of the correction information related to the learning position $P_{base+d-D+3}$ is executed is different from the current set value of D (S111: No), the process of S112 is skipped.

Further, the controller 30 determines whether the write target in the parallel processing is set (S113).

When there is the correction information set as the write target in the parallel processing by any one of S110 and S112 (S113: Yes), the controller 30 controls the read head 22r and the write head 22w to execute the parallel processing (S114). That is, the controller 30 executes learning of the correction information related to the learning position $P_{base+d}$ and writing of the correction information set as the write target in the parallel processing of S110 and S112 in parallel.

When the correction information set as the write target in the parallel processing does not exist (S113: No), the controller 30 controls the read head 22r to execute learning of the correction information related to the learning position $P_{base+d}$ (S115).

In S114 or S115, the controller 30 temporarily stores the correction information related to the learning position $P_{base+d}$ obtained by learning in, for example, the RAM 27.

After S114 or S115, the controller 30 increments a value of d by one (S116), and then, determines whether the value of d is equal to or larger than a new set value of D (S117). When the value of d is not equal to or larger than the new set value of D (S117: No), the control proceeds to S108.

When the value of d is equal to or larger than the new set value of D (S117: Yes), the controller 30 updates the reference learning position $P_{base}$ with the learning position $P_{base+D}$ (S118), and the control proceeds to S102.

When the set value of D is updated to a value different from the value stored as $D_{last}$ in S103, the parallel processing is not executed in the loop processing of S108 to S117 executed thereafter. Thus, when the new set value of D is different from the value stored as $D_{last}$ (S104: No), the controller 30 controls the write head 22w and executes writing of correction information if there is the correction information that has been obtained in the period in which the set value of D is $D_{last}$ and has not yet been written to the post code area 52 (S105). Further, the control proceeds to S106.

When the parallel processing condition is not satisfied (S102: No), the controller 30 controls the write head 22w and executes writing of correction information if there is the correction information that has already been obtained by learning and has not yet been written to the post code area 52 (S119).

Further, the controller 30 sets a learning position by an arbitrary method from the reference learning position $P_{base}$ to a position where the value of Y becomes zero, and separately executes learning of correction information at each learning position and writing of the correction information obtained by the learning (S120). That is, the controller 30 executes the control according to the comparative example in S120.

Then, a series of operations is completed.

In this manner, the magnetic disk device 1 sets a plurality of learning positions in the radial direction of the magnetic disk 11 according to the embodiment (for example, see the plurality of learning positions P in FIGS. 9 and 10 and S108 in FIG. 12). Further, the magnetic disk device 1 moves the magnetic head 22 such that the read head 22r is located on one learning position (for example, the learning position $P_n$ in FIGS. 9 and 10) among the plurality of learning positions, and performs learning of correction information (for example, see S1 in FIG. 9, S11 in FIG. 10, and S108 in FIG. 12). The one learning position is referred to as a first learning position. Further, the magnetic disk device 1 moves the magnetic head 22 such that the read head 22r is located on another learning position (for example, the learning position $P_{n+3}$ in FIG. 9 and the learning position $P_{n+4}$ in FIG. 10) among the plurality of learning positions. The other learning position is referred to as a second learning position. Incidentally, when the read head 22r is located on the second learning position, the write head 22w is located at a radial position passing through a part of the target write range RA of the correction information related to the first learning position. When the read head 22r is located on the second learning position, the magnetic disk device 1 executes writing of the correction information related to the first learning position in parallel while executing learning of correction information related to the second learning position.

Thus, according to the embodiment, the time required for learning and writing the correction information is shortened as compared with the comparative example in which the learning of the correction information and the writing of the correction information are executed in different periods. That is, the efficiency of learning and writing of correction information is improved.

Incidentally, the magnetic disk device 1 sets the other learning position at a position separated from the one learning position in a first direction. The first direction is the moving direction of the magnetic head 22 in which the read head 22r precedes the write head 22w in the radial direction of the magnetic disk 11. In the example illustrated in FIG. 4, a direction from the innermost peripheral side of the magnetic disk 11 toward the position $P_{a1}$ corresponds to the first direction in the inner area $A_{inner}$. In the outer area $A_{outer}$, a direction from the outermost peripheral side of the magnetic disk 11 toward the position $P_{a1}$ corresponds to the first direction.

In addition, according to the embodiment, the magnetic disk device 1 adjusts the interval L between learning positions (for example, see FIG. 10 and S103 in FIG. 12A) such that an end opposite to the first direction between two ends of a range through which the write head 22w passes at the time of learning of the correction information related to the other learning position (the learning position $P_{n+4}$ in FIG. 10) coincides with an end opposite to the first direction between two ends of the target write range RA of the correction information related to the one learning position.

As a result, it is possible to avoid a restriction that the interval between the target write ranges RA in the radial direction is set to be larger than the interval L between learning positions and a value larger to some extent is set as L. Since the value of L can be set without considering the interval between the target write ranges RA in the radial direction, the value of L can be reduced. As L is set to a smaller value, the magnetic disk device 1 can acquire the correction information with finer granularity, and as a result, the positioning accuracy is improved.

Incidentally, the interval L between learning positions is not necessarily adjusted as described above. For example, the interval L between learning positions may be uniform in the magnetic disk 11, and the parallel processing may be executed by the method described with reference to FIG. 9.

In addition, the parallel processing condition is satisfied, and the magnetic disk device 1 executes the parallel processing, for example, in a first area (for example, see the area 104 in FIG. 11A) according to the embodiment. For example, in a second area where the distance between head positions Y is smaller than the distance between head positions Y in the first area (for example, see the area 105 in FIG. 11A), the parallel processing condition is not satisfied. As a result, the magnetic disk device 1 sets a learning position by an arbitrary method, and separately executes learning of correction information at each learning position and writing of the correction information obtained by the learning (for example, see S120 in FIG. 12A).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for manufacturing a magnetic disk device including a magnetic disk and a magnetic head, the manufacturing method comprising:
   setting a plurality of learning positions in a radial direction of the magnetic disk;
   moving the magnetic head such that a read head of the magnetic head is located on a first learning position among the plurality of learning positions;
   learning repeatable run-out (RRO) correction information related to the first learning position when the read head is located on the first learning position using the read head;
   moving the magnetic head such that the read head is located on a second learning position among the plurality of learning positions, a write head of the magnetic head being located at a position passing through a part of a first range of the magnetic disk including the first learning position when the read head is located on the second learning position; and
   when the read head is located on the second learning position, executing writing of the RRO correction information related to the first learning position to the first range using the write head simultaneously with learning RRO correction information related to the second learning position using the read head.

2. The method according to claim 1, wherein
the setting of the plurality of learning positions further includes setting the second learning position at a position separated from the first learning position in a first direction, and
the first direction is a moving direction of the magnetic head in which the read head precedes the write head in a radial direction of the magnetic disk.

3. The method according to claim 2, wherein
the setting of the plurality of learning positions includes adjusting an interval between the plurality of learning positions such that an end on an opposite side in the first direction between two ends of a range through which the write head passes during learning of the RRO correction information related to the second learning position coincides with an end on an opposite side in the first direction between two ends of the first range.

4. The method according to claim 2, wherein
the setting of the plurality of learning positions is setting the plurality of learning positions in a first area in the radial direction,
the manufacturing method further comprising:
setting a plurality of third learning positions in the radial direction in a second area in the radial direction, a distance in the radial direction between a position of the read head and a position of the write head in the second area being smaller than the distance in the first area; and
separately executing learning of RRO correction information related to each of the plurality of third learning positions and writing of the RRO correction information related to each of the plurality of third learning positions.

5. The method according to claim 3, wherein
the setting of the plurality of learning positions is setting the plurality of learning positions in a first area in the radial direction,
the manufacturing method further comprising:
setting a plurality of third learning positions in the radial direction in a second area in the radial direction, a distance in the radial direction between a position of the read head and a position of the write head in the second area being smaller than the distance in the first area; and
separately executing learning of RRO correction information related to each of the plurality of third learning positions and writing of the RRO correction information related to each of the plurality of third learning positions.

6. The method according to claim 1, wherein
the setting of the plurality of learning positions is setting the plurality of learning positions in a first area in the radial direction,
the manufacturing method further comprising:
setting a plurality of third learning positions in the radial direction in a second area in the radial direction, a distance in the radial direction between a position of the read head and a position of the write head in the second area being smaller than the distance in the first area; and
separately executing learning of RRO correction information related to each of the plurality of third learning positions and writing of the RRO correction information related to each of the plurality of third learning positions.

* * * * *